July 21, 1964 F. E. SAKALAY 3,141,962

PARITY PREDICTING CIRCUIT

Original Filed Aug. 7, 1961 2 Sheets-Sheet 1

INVENTOR
FRED E. SAKALAY
BY Melvin P. Williams
ATTORNEY

United States Patent Office 3,141,962
Patented July 21, 1964

3,141,962
PARITY PREDICTING CIRCUIT

Fred E. Sakalay, Poughkeepsie, N.Y., assignor to International Business Machines Corporation, New York, N.Y., a corporation of New York Original application Aug. 7, 1961, Ser. No. 129,687. Divided and this application July 25, 1962, Ser. No. 212,199
4 Claims. (Cl. 235—153)

This invention relates to an improved parity predicting circuit, and more particularly to an improved circuit for predicting the parity of a multidigit adder sum which results from adding a single digit addend to a multidigit augend.

This application is a division of my copending application Serial No. 129,687, filed August 7, 1961, and entitled "Special-Function Data Processing." The subject matter disclosed and claimed herein is described in the aforementioned parent application with respect to FIGS. 25–28 thereof.

In the data processing and related art, it is well known that a multidigit unit of data may be represented by signals, and that the number of signals present may be checked by means of a redundant, non-data bit. In this manner, a signal may be present on a non-data line if the number of signals representative of the multidigit data is an even number, and no signal will be present when the number of data signals is an odd number. Alternatively, the presence of the redundant signal can indicate an odd number of data signals, etc. Persons skilled in the data processing art have come to call this redundant signal the "parity bit." Similarly, the signals indicative of the various digits in a multidigit unit of data have become known as the "data bits." Thus, a complete unit of data, in preferred data processing apparatus, comprises a plurality of data bits and a parity bit. Each bit is a ONE if the corresponding signal is present and, conversely, each bit is a ZERO if the signal corresponding therewith is absent. Thus, a multidigit unit of data comprising a plurality of ONES and ZEROS will be correspondingly represented by the presence or absence of signals on a plurality of lines, or in a plurality of bistable devices, or as inputs to amplifiers, etc. The parity bit will be a ONE if the total number of data bits is even and will be a ZERO if the total number of data bits is odd, or vice versa.

Data processing requirements frequently demand that units of data be incremented or decremented, and this is often performed by means of addition. In this way, signals indicative of data bits are combined with other signals so as to perform an addition function upon the data. In prior art adding devices, it has been found necessary to generate a new parity bit in response to the output of the adder, or to predict what the parity ought to be at the same time that the adder is determining what the new value of the data is. With the advent of higher and higher speed data processing equipment, it has been found that the method which comprises predicting what the parity ought to be is preferable to that which responds to the data output of an adder to generate a new parity bit. This is due to the fact that the new parity bit can be generated in parallel with, or concurrently with, the generation of the new data by the adder mechanism. This has been found to save considerable time, and therefore to shorten the basic machine cycle time required for a complete addition operation (which must include generation of a new parity bit).

However, parity predicting circuits known to the prior art have required the use of certain functions generated by the adder, and have therefore been operatively dependent upon the adder. This means that an error in the adder will also cause an error in the parity bit, and therefore prevent the determination of adder error by examination of the parity bit. It also means that the completion of a new parity bit must be delayed in time due to the necessity of waiting for certain functions to be generated in the adder. One parity predicting circuit known in the prior art has overcome these problems by generating a parity bit independently of the adder. However, this parity predicting circuit is dependent upon a limited power of addition in the adder. Specifically, it can predict the parity which will result from adding either a ONE or a ZERO into the lowest order of a multidigit adder only.

Furthermore, a parity bit *generated* from a sum will be correct for that sum even if the augend or the addend were in error prior to the addition operation. Also, a parity *predicted* for the sum, based on the augend and addend, will not show the sum to be in error even though the augend or addend were in error. Thus, parity circuits of the prior art can hide an adder input error.

Therefore, it is an object of this invention to provide an improved parity predicting circuit.

Other objects include:

Provision of an improved parity predicting circuit which will not hide errors in the inputs to an adder;

Provision of an improved parity predicting circuit for predicting the parity of a sum independently of the adder which generates the sum;

Provision of a parity predicting circuit which can predict the parity of a sum generated by a multidigit adder which may add ONES or ZEROS into any order of the adder;

Provision of an improved parity predicting circuit for use in conjunction with a multidigit adder, capable of predicting the parity which will result from adding either ONES or ZEROS into any digit positions of the adder completely independently of the operation of said adder.

In accordance with the present invention, parity is predicted on the basis that most additions will require a change in the parity, whereas relatively fewer, more easily recognizable additions will result in no need to change the parity. In further accord with the present invention, logical circuits analyze the signals representative of a multidigit augend input to an adder and a single digit addend input to said adder, and generates a plurality of functions each indicative of the fact that the parity of the sum will be equal to the parity of the augend, and therefore the parity need not be updated. Parity is automatically updated unless one of said functions is generated, in which case updating or changing of the parity bit is prevented.

The parity predicting circuit of the present invention eliminates the need for dependence in time or in logic upon an adder. The circuit is able to respond to an addend applied to any one of a plurality of augend digits. As seen with respect to a preferred embodiment which is described in detail hereinafter, the circuit may be implemented by means of well-known logical blocks.

The foregoing and other objects, features and advantages of the invention will be apparent from the following more particular description of a preferred embodiment thereof, as illustrated in the accompanying drawings.

In the drawings:

FIG. 1 is a simplified schematic block diagram of a preferred embodiment of a circuit for predicting parity in accordance with the present invention;

FIGS. 1*a*–1*c* are charts illustrating the effect upon parity of different one digit addends being added to multidigit augends;

*Logic Involved*

Figures 1, 1A, 1B, 1C, 2:
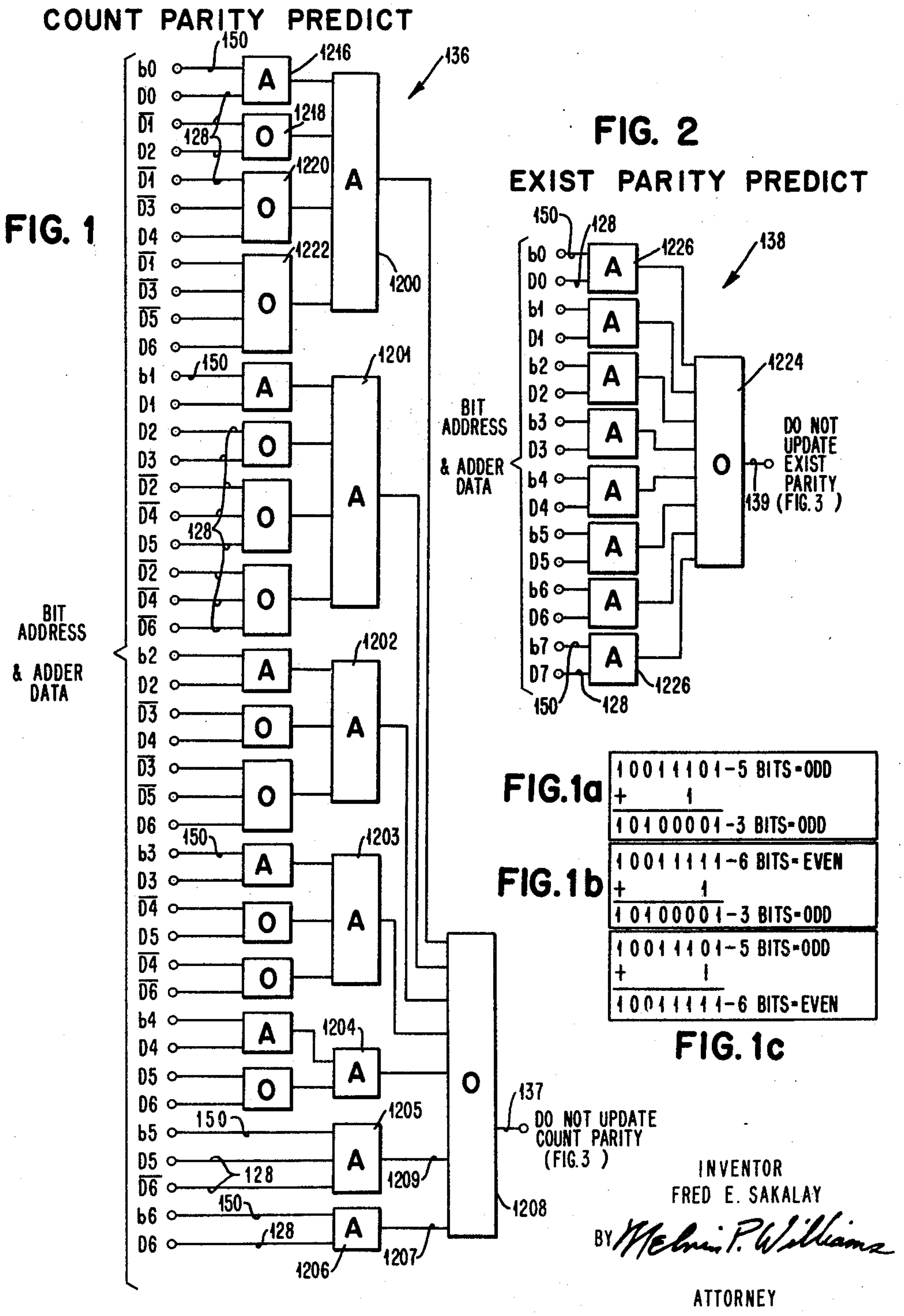
FIG. 2 is a simplified schematic block diagram of a simple circuit for predicting parity in a non-addition operation, which is shown by way of example to illustrate the manner in which the subject invention is applied in the aforementioned parent application.

Ancillary to discussion of the detailed circuitry, it should be understood that the invention is disclosed in a simplified, exemplary embodiment wherein the nature of the logical blocks is not indicated beyond the function which the blocks are to perform.

Specifically, five types of logical circuits are used: an AND circuit, which is a block containing an "A"; an OR circuit, which is shown as a block containing a "0"; an EXCLUSIVE OR circuit which is a block containing a "∀"; a latch circuit which is a block containing an "L"; and an inverter is shown as a block with an "I" in it. All of the blocks are so arranged that inputs are applied to the left-hand side, and outputs leave the blocks from the right-hand side. All information propagates from left to right in each figure, and the direction of propagation is best understood by reference to which side of a block a line is entering.

*Background Description of Environment*

As is disclosed in detail in the parent application, the subject invention is designed for use in a machine which is capable of handling a "BYTE" of data which comprises eight data bits, which are identified in the drawing as D0, D1, . . . D7, and it is contemplated that the complement of these bits will be available. Thus, if data bit D0 is a ONE, then there will be a signal on the D0 line and no signal on the $\overline{D0}$ line. Alternatively, if the data bit D0 is characterized by numerical zero, then there will be no signal on the D0 line and there will be a signal on the $\overline{D0}$ line. Further, the invention is disclosed in an embodiment which utilizes signals which may be supplied by supplementary data processing equipment as exemplified in the embodiment of the parent application. In the parent application, the adder may perform either one of two functions. The COUNT function is characterized by adding one digit to a selected one of the eight digits of a byte. The EXIST function is characterized by "OR'ing" one data bit to any selected one of the eight data bits in a byte. Thus, when a COUNT is performed, the eight bit augend is incremented an amount determined by which of the bit positions in the augend the one bit addend is added to. Similarly, in the EXIST function, the eight bit augend may or may not be modified: if a ONE is ORed into a position which already has a ONE, the augend is not modified; if a ONE is ORed into a bit position of the augend which originally contains a ZERO, then the augend is modified. Thus, in the adder shown in the parent application, for which the preferred embodiment of the instant invention is designed to predict the parity, two different operations may be performed, and therefore two different parity results may be required. For this reason, the circuit of FIG. 2 has been shown in order to put the embodiment of the present invention into context with the embodiment of the parent application.

*Count Parity Predict*

FIG. 1 shows the COUNT PARITY PREDICT circuit 136, which compares the original ADDER DATA (the augend) with the BIT ADDRESS which identifies the particular bit into which a ONE is added (the addend) so as to determine—not what the answer will be, but—whether or not any answer will occur which will require updating of parity. In fact, the logic involved in the circuit is such as to supply a DO NOT UPDATE COUNT PARITY signal on the line 137 whenever parity can remain the same as it was as the ADDER DATA (the augend) entered the adder (not shown). Alternatively, if no signal appears on the line 137, the parity *will* be updated.

Referring to FIG. 1*a*, an augend with five ONES and three ZEROS therein is shown having a ONE added into the third-from-lowest order bit position (which corresponds to BIT–2 in the subject embodiment). The augend 10011101 has five ONES in it and, therefore, is odd. The sum 1100001 has 3 bits in it and is therefore *also* odd. The ONE (addend) was added into a bit position (BIT–2 position) which had an even number of ONES in subsequent higher-order bit positions (BIT–3, BIT–4) followed by a ZERO in the third higher-order bit position (BIT–5). Therefore, a ONE added into a bit position of the augend, which bit position *together* with consecutives ONES in *subsequent higher-order* bit positions totals an odd number, will retain the same parity that it had prior to adding the ONE therein.

FIG. 1*b* illustrates adding into a bit position (in this case, the BIT–1 position) of an augend 10011111. The bit position into which the ONE is added in this case has three additional subsequent higher-ordered bit positions (BIT–2, BIT–3, BIT–4) with ONE therein, meaning that the addend bit position *together* with *subsequent higher-order* bit positions having ONES total an even number. The augend 10011111 has six ONES, an even number, whereas the sum 10100001 has three ONES, an odd number. Therefore, when a ONE is added into the lowest of an even-numbered string of ONES, the parity must be changed.

FIG. 1*c* illustrates the effect on parity whenever a ONE is added into a bit position of the augend which is a ZERO. Since ONE and ZERO equal ONE without a carry, there is invariably an additional ONE in the sum than there was in the augend and, therefore, the parity bit always has to be changed.

Since it is easier to take into account only the situation in FIG. 1*a* (that is, adding into the lowest of an odd number of ONES in the augend) than it is to account for both the situations in FIG. 1*b* (adding into the lowest position in the augend which comprises a series of even number of ONES) and in FIG. 1*c* (which comprises adding into a bit position of the augend which has a ZERO therein), the circuit of FIG. 1 recognizes those conditions designated in FIG. 1*a* (where parity is *not* affected) and thereby generates a signal which says DO NOT UPDATE COUNT PARITY on the line 137.

A plurality of AND circuits 1200–1206 each corresponds to the fact of adding into one of the seven lowest-ordered bit positions BIT–0 BIT–6. The basic logic can be derived with reference to FIG. 1*a*. No AND circuit corresponding to AND circuits 1200–1206 is provided, and, therefore, no input to OR circuit 1208 is provided to account for addition into the BIT–7 position (the 8th bit position) since *any* addition into the BIT–7 position will automatically require an updating of parity. For instance, if there were a ZERO in the BIT–7 position of the augend and a ONE were added into it, then there would be a ONE in the sum which would not otherwise appear. Similarly, if there were a ONE in the BIT–7 position of the augend, and a ONE were added to it, this would change the BIT–7 position of the sum to a ZERO, the resulting "carry" would propagate into the *next* byte, as an "overflow" and thereby not effect the new sum in the present byte. Adding into the BIT–6 position will not change parity if there were a ONE in the BIT–6 position since this will cause a "carry" into the BIT–7 position and a "carry" into the BIT–7 position will either change a ONE to a ZERO or a ZERO to a ONE, which will counterbalance the corresponding change in the BIT–6 position. If there were a "carry" from the BIT–7 position as a result of the "carry" out of the BIT–6 position, this "carry" will not affect the parity of the existing byte (the augend) since this will be "carried" over into the *next* byte or carried off as an OVERFLOW OF COUNT (in the parent application). Therefore, the AND circuit 1206 responds to a BIT ADDRESS $b6$ on line 150 (indicating the addend) and an ADDER DATA bit D6 on a line 128 (indicating the BIT–6 position of the augend) to generate a signal passing over a line 1207, through the OR circuit 1208, to the line 137, to indicate that the count parity should *not* be updated.

Note that there can be *no* output from any of the AND circuits 1200–1205 if there *is* an output from the AND circuit 1206 since each of these AND circuits responds (as described more fully hereinafter) only if an associated AND circuit (yet to be introduced) has a BIT ADDRESS input on a line 150. Since there is only one BIT ADDRESS made available to any of these circuits at one time, it is therefore impossible for more than one of the AND circuits 1200–1206 to have an output at a single time. This follows, since the adder (the FIRST SUM and FINAL SUM GENERATORS in the parent application) operates by way of adding only a single-bit addend into an eight-bit augend.

The AND circuit 1205 corresponds to the 6th order bit or BIT–5 position of the augend and responds to a BIT ADDRESS signal $b5$ on a line 150 together with an ADDER DATA signal D5 on one of the lines 128 and the lack of ADDER DATA in the BIT–6 position, which is indicated by a $\overline{D6}$ signal ("not D6") on another of the lines 128, to supply an output on a line 1209 to the OR circuit 1208. In terms of logic, this means the AND circuit 1205 will generate a signal indicating that parity should *not* be updated if the addend adds a ONE into the BIT–5 position of the augend, when the augend has a ONE therein, and the BIT–6 position of the augend has a ZERO. This follows from FIG. 1*a* since adding into a bit position of the augend for which the next subsequent higher-ordered bit position has a ZERO therein is adding into a bit position of the augend which, together with the subsequent higher-ordered bit positions which contain a ONE, comprises an *odd* number. (In this case, there are no higher-ordered bit positions with a ONE and, therefore, the bit position of the augend into which the ONE is added equals an odd number by itself.)

The logical circuits which provide outputs from the remainder of the AND circuits 1200–1203 operate similarly, except the expressions become more and more complicated as a result of the fact that, adding into a much lower-ordered bit position requires taking cognizance of more subsequent higher-ordered bit positions in order to determine whether or not there is an odd number of subsequent higher-ordered bit positions with a ONE contained in them. By way of example, the input to the AND circuit 1200, which is the most complicated, will be examined in greater detail.

The expression for the circuit of FIG. 1*a* when the addend is a ONE in the BIT–0 position is as follows:

$$(b0D0)(\overline{D1}+D1D2\overline{D3}+D1D2D3D4\overline{D5}+D1D2D3D4D5D6)$$

Using the Boolean algebra axioms:

$$(A+\overline{A}B)=(A+B), \text{ and } (A+BC)=(A+B)(A+C)$$

and by factoring, this equation is reduced as follows:

$$(b0D0)(\overline{D1}+D2\overline{D3}+D2D3D4\overline{D5}+D2D3D4D5D6)$$
$$(b0D0)(\overline{D1}+D2(\overline{D3}+D3D4\overline{D5}+D3D4D5D6))$$
$$(b0D0)(\overline{D1}+D2(\overline{D3}+D4(\overline{D5}+D5D6)))$$
$$(b0D0)(\overline{D1}+D2(\overline{D3}+D4(\overline{D5}+D6)))$$
$$(b0D0)(\overline{D1}+D2((\overline{D3}+D4)(D3+\overline{D5}+D6)))$$
$$(b0D0)(\overline{D1}+D2)(\overline{D1}+\overline{D3}+D4)(\overline{D1}+\overline{D3}+\overline{D5}+D6)$$

Thus, it is seen that the expression on the first line has two functions added together, one of which requires a plurality of OR circuits, and three of the four inputs to the one of the OR circuits would be outputs from AND circuits. This means that it would require three levels of logic in order to generate the function in the first line. The function in the last line can be generated with two levels of logic and with fewer input connections. Inasmuch as one of the objectives of the present embodiment and the embodiment of the parent application is to perform special functions within as little time as possible, the elimination of one level of logic in this particular circuit is a great advantage. Furthermore, the simplification resulting in elimination of circuitry is also significant. The AND circuit 1200 in FIG. 1 corresponds to the last line of Boolean algebra (supra) as follows: The $(b0D0)$ function is performed in an AND circuit 1216; the $(\overline{D1}+D2)$ function is performed in an OR circuit 1218; the $(\overline{D1}+\overline{D3}+D4)$ function is performed in an OR circuit 1220, and the $(\overline{D1}+\overline{D3}+\overline{D5}+D6)$ function is performed in an OR circuit 1222. The logic for the AND's and OR's which feed the other AND circuits 1201–1204 can be similarly developed, each of the functions being simpler and requiring less equipment, as shown.

*Exist Parity Predict*

FIG. 2 shows the EXIST PARITY PREDICT circuit 128 which generates a signal on a line 139 in response to EXIST operations which do *not* require an updating of parity. An OR circuit 1224 responds to a plurality of AND circuits 1226, each of which responds to respectively corresponding BIT ADDRESS and ADDER DATA signals on lines 150 and 128, respectively. Thus, in an EXIST operation, if there is a bit "existing" in a particular bit position of a byte of data, and the BIT ADDRESS causes a bit to be ORed into that particular bit position, the bit position will remain the same and, therefore, parity need not be updated. On the other hand, if, for instance, the BIT–2 position has no data stored therein, there will be no $b2$ signal on a line 150 so that the corresponding AND circuit 1226 will be blocked and there will be no output as a result thereof from the OR circuit 1224. Since there cannot possibly be a BIT ADDRESS applied to any other AND circuit (the BIT ADDRESS selects only one particular bit position to perform the EXIST operation in the embodiment of the parent application), there will be no other inputs to the OR circuits 1224 and, therefore, *no* DO NOT UPDATE EXIST PARITY signal will appear on line 139.

*Parity Update*

Figure 3:
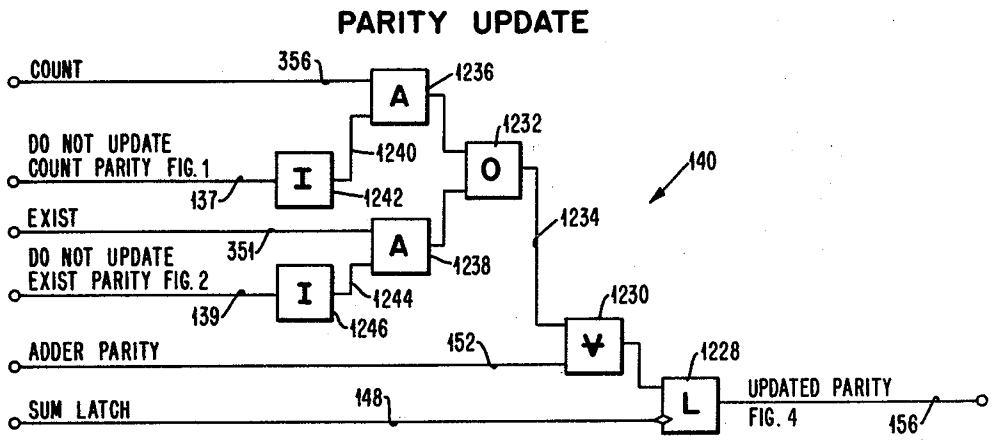
FIG. 3 is a simplified schematic block diagram of a circuit for changing or updating parity in response to a selected one of the parity predicting circuits shown in FIGS. 1 and 2.

FIG. 3 shows the PARITY UPDATE circuit 140 which responds to the "DO NOT UPDATE . . . PARITY" signals from FIGS. 1 and 2 so as to either update parity or not update parity as required. A latch 1228 registers the finalized parity in response to a SUM LATCH signal on the line 148, and generates an UPDATED PARITY signal on a line 156. Although the output on line 156 is called "UPDATED PARITY," it may or may not be the same as the adder parity bit supplied with the augend over the line 152. The input to the latch 1228 is derived from an EXCLUSIVE OR circuit 1230 which, in turn, receives an ADDER PARITY signal on a line 152 and the output of an OR circuit 1232 over a line 1234. The ADDER PARITY on line 152 is the same parity which accompanied the particular byte of data (the augend) into the adder. The OR circuit 1232 is responsive to either of two AND circuits 1236 or 1238. The AND circuit 1236 is responsive to a COUNT instruction on a line 356 and to a signal on the line 1240 which comprises the output from an inverter 1242. The inverter 1242 inverts the DO NOT UPDATE COUNT PARITY signal (from FIG. 1) on line 137. Therefore, if there is a DO NOT UPDATE COUNT PARITY signal on line 137, there will be *no* signal on line 1240 and the AND circuit 1236 will have *no output* therefrom. Similarly, AND circuit 1238 responds to a signal on line 1244 which is the output of an inverter 1246. The inverter 1246 inverts the DO NOT UPDATE EXIST PARITY signal on line 139 (from FIG. 2). Thus, if there is a DO NOT UPDATE EXIST PARITY signal, there will be *no* signal on line 1244 and, therefore, *no output* from the AND circuit 1238. The AND circuit 1236 will pass a signal from the line 1240 *only* if a count instruction is present on line 356. Therefore, although the COUNT PARITY PREDICT circuit of FIG. 1 may generate an output signal on line 137, this signal will *not* be recognized unless a COUNT operation is being performed. Similarly, the EXIST PARITY PREDICT circuitry of FIG. 2 may also perform a parity predicting operation and derive a signal on line 139, but this signal will *not* be recognized except during an EXIST operation. It follows that, in order to get a signal on line 1234, there must be either a COUNT or EXIST operation being performed and, if a COUNT operation is being performed, there must be *no* DO NOT UPDATE COUNT PARITY signal on line 137. Similarly, in order to get a signal on line 1234 during an EXIST operation, there must be *no* DO NOT UPDATE EXIST PARITY signal on line 139. The signal on line 1234 will change the ADDER PARITY signal on line 152 from a ZERO to a ONE or from a ONE to a ZERO by means of the EXCLUSIVE OR circuit 1230. Therefore, if parity *is* to be updated and no ADDER PARITY signal appears on line 152, the EXCLUSIVE OR circuit 1230 will send a signal to the latch 1228; conversely, if there *is* an ADDER PARITY signal on line 152, the EXCLUSIVE OR circuit 1230 will *not* send a signal to latch 1228. If no signal appears on the line 1234, which designates the fact that ADDER PARITY is *not* to be updated, the EXCLUSIVE OR circuit will pass either a ZERO or a ONE on the line 152 to the latch 1228 so that the output of the latch on line 156 will be the same as the input to the EXCLUSIVE OR circuit 1230 on the line 152. Therefore, although the output of the latch 1228 on line 156 is called "UPDATED PARITY," it may in fact be a "non-updated" parity bit in the case when parity is *not* to be updated, or a changed parity bit in a case where parity *is* to be updated.

*Adder Check*

Figure 4:
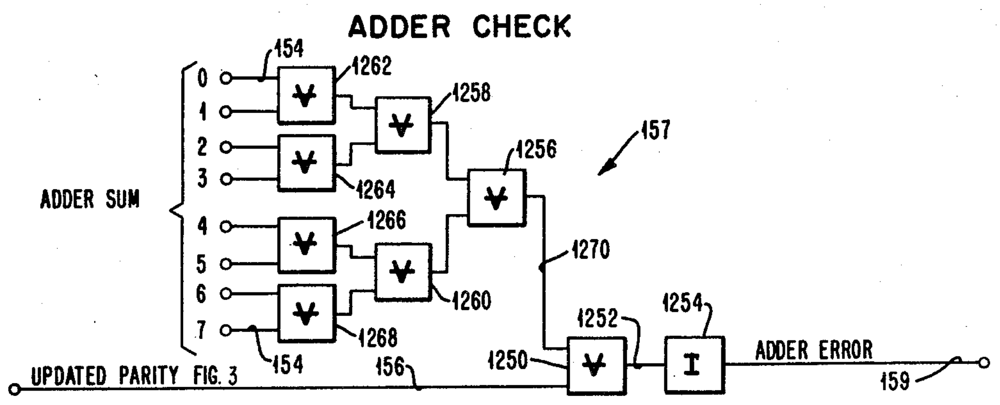
FIG. 4 is a simplified schematic block diagram of a circuit for checking the sum of an adder against the updated parity to determine whether or not adder error has occurred in generating the adder sum.

FIG. 4 shows an ADDER CHECK circuit 157. Specifically, the UPDATED PARITY signal on line 156 (from FIG. 3) is compared with the ADDER SUM (from the adder, not shown) to determine whether or not an error occurred *either* in deriving the ADDER SUM in the adder *or* in deriving the UPDATED PARITY in FIGS. 1–3: The ADDER CHECK circuitry 157 *cannot* distinguish between them. If there is an error, an EXCLUSIVE OR circuit 1250 will be blocked, giving no signal on a line 1252, so that the output of an inverter 1254 will provide an ADDER ERROR signal on the line 159. The EXCLUSIVE OR circuit 1250 responds to the UPDATED PARITY and the output of an EXCLUSIVE OR tree which compares the ADDER SUM bits. Specifically, an EXCLUSIVE OR circuit 1256 receives signals from two EXCLUSIVE OR circuits 1258 and 1260. The EXCLUSIVE OR circuit 1258 derives its inputs from two EXCLUSIVE OR circuits 1262 and 1264. The EXCLUSIVE OR circuit 1262 will have no output therefrom if both the BIT–0 and BIT–1 of the ADDER SUM on lines 154 are ONES, or if both of them are ZEROS. However, if only one of these bits is a ONE, then there will be an output from the EXCLUSIVE OR circuit 1262. Therefore, an output from the EXCLUSIVE OR circuit designates an *odd* number of bits. Similarly, the EXCLUSIVE OR circuit 1264 will have an output therefrom if the total of BIT–2 and BIT–3 is an odd number, the EXCLUSIVE OR circuit 1266 will have an output therefrom if the total of BIT–4 and BIT–5 is an odd number, and the EXCLUSIVE OR circuit 1268 will have an output therefrom if the total of BIT–6 and BIT–7 is an odd number. The EXCLUSIVE OR circuit 1258 will have no output if both EXCLUSIVE OR circuits 1262 and 1264 supply inputs thereto, or if neither of them do. Therefore, EXCLUSIVE OR circuit 1258 will have a signal only if the sum total of BIT–0, BIT–1, BIT–2 and BIT–3 is an odd number. Similarly, EXCLUSIVE OR circuit 1260 will have an output therefrom only if the sum total of BIT–4, BIT–5, BIT–6 and BIT–7 is an odd number. It follows that there will be a signal on a line 1270 only if there is an *odd* number of bits in the ADDER SUM on lines 154. If there is an *odd* number of bits, this means that parity *is correct without* a parity signal and, therefore, there *should be no UPDATED PARITY* bit on the line 156. If, in fact, there *is no signal* on line 156, there will be an output from the EXCLUSIVE OR circuit on line 1252 so that there will be no output from the inverter 1254 on line 159. On the other hand, if an erroneous UPDATED PARITY bit *does appear* on line 156, the EXCLUSIVE OR circuit 1250 will be blocked because of having both inputs thereto and, there being no signal on line 1252, the inverter 1254 will supply an ADDER ERROR SIGNAL on line 159. Similar operation obtains when there is no signal on line 1270, indicating an even number of bits.

While the invention has been particularly shown and described with reference to a preferred embodiment thereof, it will be understood by those skilled in the art that various changes in form and details may be made therein without departing from the spirit and scope of the invention.

What is claimed is:

1. A data processing system in which data is manifested as representations of the binary values ONE and ZERO in a group, and in which the data manifestations are arranged in a sequence of bit positions, the sequence of manifestations exhibiting one or the other of two parity conditions, and odd parity condition if the total number of ONES therein is an odd number and otherwise an even parity condition, the sequence having a parity manifestation associated therewith in such a manner that the parity manifestation indicates whether or not said sequence exhibits a first one of said parity conditions, comprising:

address means for designating a selected one of the manifestations in said group;

parity predicting means responsive to the manifestations in said group and to said address means for generating a signal in response to a given condition, said given condition obtaining when a set of manifestations in the selected position in said group designated by said address means and in positions subsequent and adjacent to said selected position comprise a successive group of ONES exhibiting said first parity condition;

parity changing means for changing the associated parity manifestation from a ONE to a ZERO, or from a ZERO to a ONE, alternatively;

and means responsive to said parity predicting means for selectively blocking said parity changing means, whereby said parity manifestation will remain unchanged.

2. In a data processing system of the type in which a plurality of data manifestations identifiable as either binary ONES or ZEROS are arranged in a group and the group of data manifestations has associated therewith a parity manifestation, the parity manifestations being a ONE whenever the group has a total number of ONES therein which equals an even number, the manifestations being in an ordered sequence of positions in said group, comprising:

address means for designating a selected one of the manifestations in a group;

parity predicting means responsive to the manifestations in a group and to said address means for generating a signal in response to there being an odd number of ONES in the selected position in said group designated by said address means and in positions subsequent and adjacent to said selected position;

parity changing means for changing the associated parity manifestation from a ONE to a ZERO, or from a ZERO to a ONE, alternatively, said parity changing means being selectively blockable;

and means responsive to said parity predicting means for selectively blocking said parity changing means, whereby said parity manifestation will remain unchanged.

3. A data processing system in which data is manifested as representations of the binary values ONE and ZERO, and in which the data manifestations are arranged in a sequence of bit positions, the sequence of manifestations exhibiting one or the other of two parity conditions, an odd parity condition if the total number of ONES therein is an odd number and otherwise an even parity condition, the sequence having a parity manifestation associated therewith in such a manner that the parity manifestation will be a ONE whenever the sequence exhibits a first one of said parity conditions, comprising:

means for designating a first one of said bit positions;

AND circuit means for providing a signal in response to said designating means and the data manifestation designated thereby to generate a signal indicative of a ONE being manifested in said designated bit position;

OR circuit means responsive to manifestations in a pair of bit positions adjacent and subsequent in said sequence to said designated bit position, said OR circuit means providing a signal in response to a ZERO in one of said pair of positions or to a ONE in the other of said pair of bit positions;

blocking means responsive to both said AND circuit means and said OR circuit means for generating a signal indicative of signals generated by both said AND circuit means and said OR circuit means;

means for changing the parity manifestation associated with said sequence from a ONE to a ZERO, or from a ZERO to a ONE, alternatively;

and means responsive to said blocking means for blocking the operation of said parity bit changing means, whereby said parity manifestation will remain unchanged.

4. A data processing system in which data is manifested as representations of the binary values ONE and ZERO, and in which the data manifestations are arranged in a sequence of bit positions, the sequence of manifestations having a parity manifestation associated therewith in such a manner that the parity manifestation will be a ONE whenever the total number of ONES in the related sequence of data manifestations is an even number, comprising:

means for designating a first one of said bit positions;

AND circuit means for providing a signal in response to said designating means and the data manifestation designated thereby to generate a signal indicative of a ONE being manifested in said designated bit position;

OR circuit means for providing a signal in response to a ZERO in a first bit position adjacent and subsequent in said sequence to said designated bit position or to a ONE in a second bit position adjacent and subsequent in said sequence to said first bit position;

blocking means responsive to both said AND circuit means and said OR circuit means for generating a signal indicative of signals generated by both said AND circuit means and said OR circuit means;

means for changing the parity manifestation associated with said sequence from a ONE to a ZERO, or from a ZERO to a ONE, alternatively;

and means responsive to said blocking means for blocking the operation of said parity bit changing means, whereby said parity manifestation will remain unchanged.

References Cited in the file of this patent

UNITED STATES PATENTS 3,036,770 Harrison -------------- May 29, 1962